United States Patent [19]

DePuy

[11] Patent Number: 4,561,047

[45] Date of Patent: Dec. 24, 1985

[54] SWITCHING REGULATOR CURRENT LIMIT CIRCUIT

[75] Inventor: Robert P. DePuy, Cherry Hill, N.J.

[73] Assignee: General Electric Company, King of Prussia, Pa.

[21] Appl. No.: 562,892

[22] Filed: Dec. 19, 1983

[51] Int. Cl.$^4$ ............................................. H02H 7/122
[52] U.S. Cl. ....................................... 363/56; 363/21; 361/18; 361/92
[58] Field of Search ........................ 363/55, 56, 20–21, 363/95, 97, 131; 361/18, 92, 79, 87, 100–101

[56] References Cited

U.S. PATENT DOCUMENTS

| | | | |
|---|---|---|---|
| 4,063,307 | 12/1977 | Stephens | 363/56 X |
| 4,330,816 | 5/1982 | Imazeki et al. | 363/21 X |
| 4,447,841 | 5/1984 | Kent | 363/56 X |

Primary Examiner—Peter S. Wong
Attorney, Agent, or Firm—William Freedman

[57] ABSTRACT

A series flyback switching regulator, having a transformer with a primary coil for receiving an unregulated input voltage and a secondary coil for providing a regulated output voltage, includes a circuit for limiting the magnitude of a substantial overload or short circuit current. The current limiting circuit senses the magnitude of current flowing through the primary coil and sets a current limit level which is based upon a predetermined maximum current allowed in the primary coil. The current limiting circuit also senses the magnitude of the voltage present at the secondary coil of the transformer and reduces the current limit level, based upon a sensed reduction in the secondary coil voltage. The input voltage is removed from the primary coil when the magnitude of the current through the primary coil exceeds the current limit level as reduced by the sensed reduction of the voltage appearing across the secondary coil.

13 Claims, 2 Drawing Figures

SWITCHING REGULATOR CURRENT LIMIT CIRCUIT

BACKGROUND OF THE INVENTION

This invention is related to voltage regulators and more particularly to a circuit for limiting output current in a flyback switching regulator.

Flyback switching regulators are often selected because they provide good output voltage regulation over relatively large variations in input voltage. However, since the peak current in the secondary of a flyback transformer increases while its average value stays the same with a drop in primary voltage, the primary current increases both in magnitude and duration, causing current limiting to be very difficult to achieve. One form of current limiting has been to place a resistor in series with the primary coil for sensing the current through the primary. If the output of the flyback transformer circuit is shorted, and the circuit is current limited by measuring the primary current, the secondary current will increase. If the regulator is designed for a large input voltage swing, the secondary current could increase several times its rating. This current limit circuit operates by turning off the primary current at a predetermined level and back on at a predetermined point in the cycle. As long as the short remains, the very large secondary circuit current will flow.

For small changes in input voltage, it is feasible to use a sensing resistor in the primary circuit for limiting output current since the current set point can be based upon minimum input voltage variations. However, for large variations in input voltage, the current set point must be selected such that the output current can grow quite large in a short circuit fault situation.

Accordingly, it is an object of the present invention to provide a switching voltage regulator having improved short circuit current limiting characteristics.

It is another object of the present invention to provide a switching regulator current limit circuit for limiting overload output currents in flyback switching regulators.

It is a further object of the present invention to provide a series switching regulator employing a feedback coil on a flyback transformer to sense the output voltage and modify the current limit point to a lower level.

These and other objects of the present invention will become apparent to those skilled in the art upon consideration of the following description of the invention.

SUMMARY OF THE INVENTION

The present invention comprises means for limiting the magnitude of a substantial overload or short circuit current in the output of a series switching voltage regulator which utilizes a transformer having a primary coil for receiving an unregulated input voltage and a secondary coil for providing a regulated output voltage. The short circuit current limiting means comprises means for sensing the magnitude of current flowing through the primary coil and means for setting a current limit level which is based upon a predetermined maximum current magnitude allowable in the primary coil.

The short circuit current limiting means also comprises means for sensing the magnitude of the voltage present at the secondary coil of the transformer and means for reducing the current limit level, based upon a sensed reduction in the secondary coil voltage. The short circuit current limit means further comprises means for removing the input voltage from the primary coil when the magnitude of the current through the primary coil exceeds the current limit level as reduced by the sensed reduction of the voltage appearing across the secondary coil.

DETAILED DESCRIPTION OF THE DRAWINGS

Figure 1:
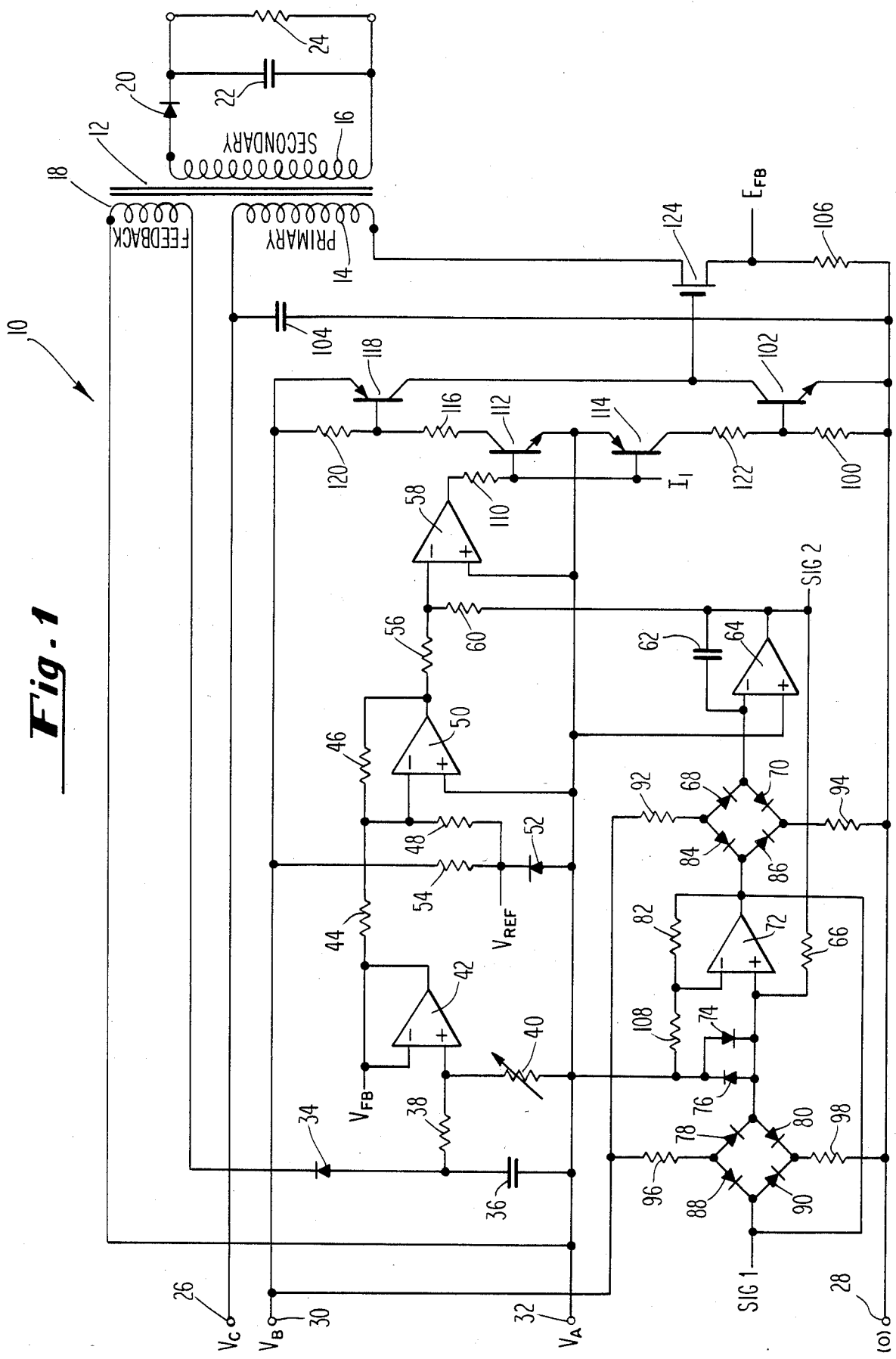

While the specification concludes with claims particularly pointing out and distinctly claiming that which is regarded as the present invention, the object and advantages of this invention can be more readily ascertained from the following description of a preferred embodiment when read in conjunction with the accompanying drawings in which:

FIG. 1 a schematic diagram of a preferred embodiment of a flyback switching regulator circuit in accordance with the present invention.

Figure 2:
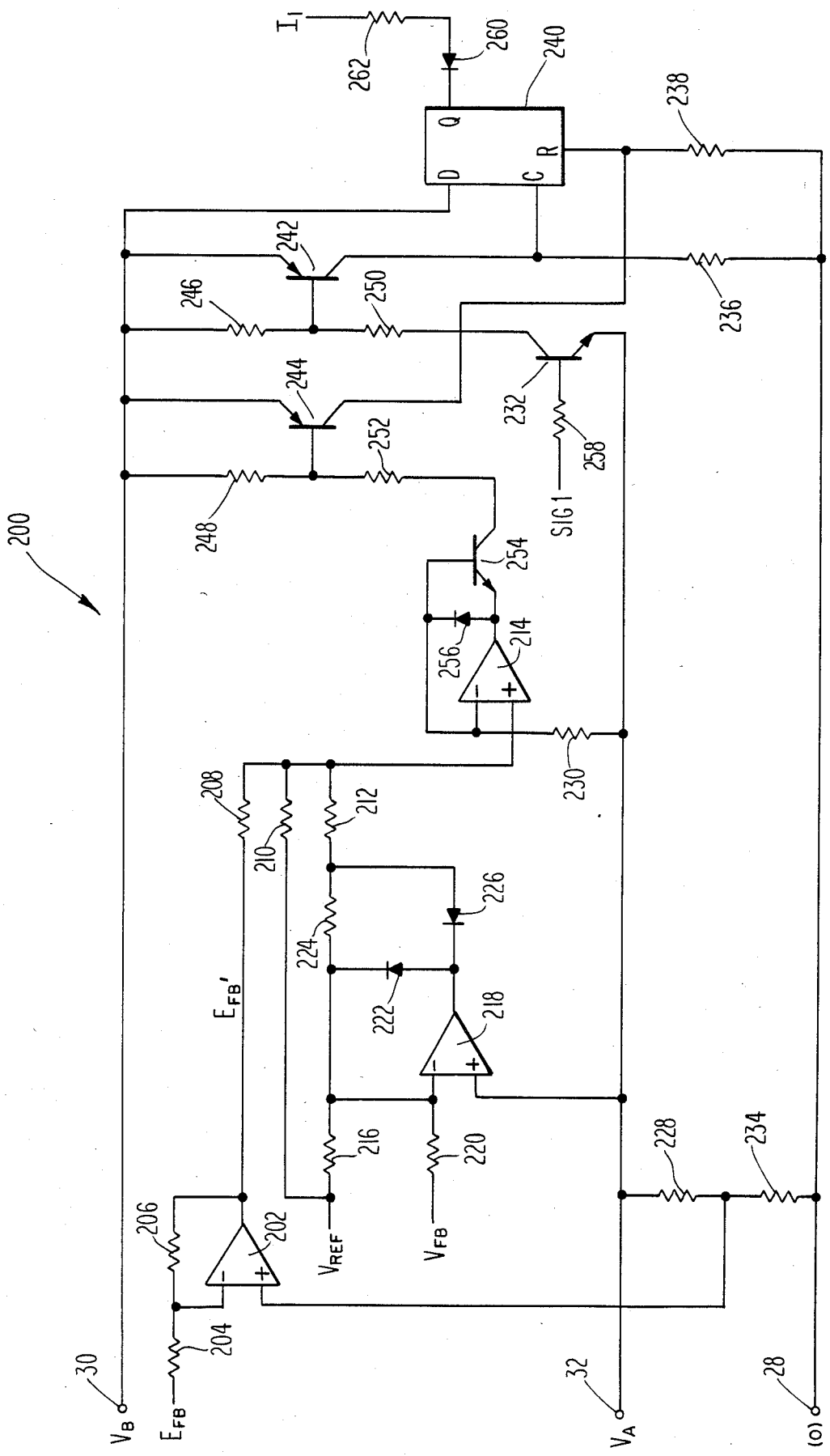

FIG. 2 is a schematic diagram of a preferred embodiment of a switching regulator current limit circuit in accordance with the present invention.

DETAILED DESCRIPTION OF THE PREFERRED EMBODIMENT

Referring to FIG. 1, there is shown a preferred embodiment of a flyback switching regulator circuit in accordance with the present invention, generally designated 10. The regulator circuit 10 includes a transformer 12 having a primary coil 14, a secondary coil 16, and a feedback coil 18. A diode 20, in series with a 330 microfarad capacitor 22 are electrically connected across the secondary coil 16. In the preferred embodiment, the diode 20 is a type RGP 30J. A load 24 is electrically connected across capacitor 22. The preferred embodiment regulator is designed to supply two amps at twenty volts; therefore the load 24 is typcially ten ohms.

An input supply voltage $V_C$ is electrically connected between a first terminal 26 and a common or (0) reference level second terminal 28. In the preferred embodiment, the average input voltage is approximately 125 volts DC. Input voltages, $V_B$ and $V_A$, for control power are connected between a third terminal 30 and the reference level (0) terminal 28, a fourth terminal 32 and the (0) terminal respectively. One side of the feedback coil 18 is electrically connected to the fourth ($V_A$) terminal 32, and the other side is connected to the cathode of a diode 34. In the preferred embodiment shown, all diodes, other than diode 20, are type 1N4148. The anode of the diode 34 is electrically connected to one terminal of a 0.047 microfarad capacitor 36 and one terminal of a 50 K-ohm resistor 38. The second terminal of capacitor 36 is electrically connected to the $V_A$ terminal 32. The second terminal of resistor 38 is electrically connected to one terminal of an adjustable resistor 40, and the non-inverting (+) input of an operational amplifier 42. Resistor 40 is preferably adjusted to 10 K-ohm. In addition, all operational amplifiers are preferably Texas Instrument type TL074. The other terminal of adjustable resistor 40 is electrically connected to the $V_A$ terminal 32.

The output of operational amplifier 42 is electrically connected to its inverting (−) input and to one terminal of a 4 K-ohm resistor 44. The other terminal of resistor 44 is electrically connected to one terminal of a 250 K-ohm resistor 46, one terminal of a 2.5 K-ohm resistor 48 and the inverting (−) input of an operational amplifier 50. The other terminal of resistor 48 is electrically connected to the cathode of a zener diode 52 and one terminal of a 4.7 K-ohm resistor 54. The zener diode 52 is preferably a Teledyne type 9491 BM. The anode of zener diode 52 is electrically connected to the $V_A$ terminal 32. The other terminal of resistor 54 is electrically connected to the $V_B$ terminal 30. The non-inverting (+) input of operational amplifier 50 is electrically connected to the $V_A$ terminal 32.

The other terminal of a 250 K-ohm resistor 46 is electrically connected to the output of operational amplifier 50 and one terminal of a 10 K-ohm resistor 56. The other terminal of resistor 56 is electrically connected to the inverting (−) input of an operational amplifier 58 and one terminal of a 10 K-ohm resistor 60. The non inverting (+) input of operational amplifier 58 is electrically connected to the $V_A$ terminal 32. The other terminal of resistor 60 is electrically connected to one terminal of a 2200 picofarad capacitor 62, the output of an operational amplifier 64, and one terminal of a 5.2 K-ohm resistor 66. The other terminal of capacitor 62 is electrically connected to the inverting (−) input of operational amplifier 64, the cathode of a diode 68 and the anode of a diode 70. The non-inverting (+) input of operational amplifier 64 is electrically connected to the $V_A$ terminal 32. The second terminal of resistor 66 is electrically connected to the non-inverting (+) input of an operational amplifier 72, the cathode of a diode 74, the anode of a diode 76, the cathode of a diode 78 and the anode of a diode 80.

The output of operational amplifier 72 is electrically connected to one terminal of a 10 K-ohm resistor 82, the cathode of a diode 84, the anode of a diode 86, the cathode of a diode 88 and the anode of a diode 90. The anode of diode 84 is electrically connected to the anode of diode 68 and one terminal of a 10 K-ohm resistor 92. The cathode of diode 86 is electrically connected to the cathode of diode 70 and one terminal of a 10 K-ohm resistor 94. The other terminal of resistor 92 is electrically connected to one terminal of a 10 K-ohm resistor 96 and the $V_B$ terminal 30. The other terminal of resistor 96 is electrically connected to the anode of diode 78 and the anode of diode 88.

The second terminal of resistor 94 is electrically connected to one terminal of a 10 K-ohm resistor 98, one terminal of a 1 K-ohm resistor 100, the emitter of an NPN transistor 102, one terminal of a 1 microfarad capacitor 104 and one terminal of a 0.4 ohm resistor 106 and the (0) terminal 28. In the preferred embodiment, all NPN transistors are type 2N2222. The second terminal of resistor 98 is electrically connected to the cathode of diode 80 and the cathode of diode 90. The second terminal of resistor 82 is electrically connected to the inverting (−) input of operational amplifier 72 and one terminal of a 10 K-ohm resistor 108. The other terminal of resistor 108 is electrically connected to the anode of diode 74, the cathode of diode 76 and the $V_A$ terminal 32.

The output of operational amplifier 58 is electrically connected to one terminal of a 10 K-ohm resistor 110. The second terminal of resistor 110 is electrically connected to the base of an NPN transistor 112 and the base of a PNP transistor 114. In the preferred embodiment, all PNP transistors are type 2N2907. The emitter of transistor 112 is electrically connected to the emitter of transistor 114 and the $V_A$ terminal 32. The collector of transistor 112 is electrically connected to one terminal of a 1 K-ohm resistor 116. The other terminal of resistor 116 is electrically connected to the base of a PNP transistor 118 and one terminal of a 1 K-ohm resistor 120. The other terminal of resistor 120 is electrically connected to the emitter of transistor 118 and the $V_B$ terminal 30.

The collector of transistor 114 is electrically connected to one terminal of a 1 K-ohm resistor 122. The other terminal of resistor 122 is electrically connected to the base of transistor 102 and the second terminal of resistor 100. The collector of transistor 102 is electrically connected to the collector of transistor 118 and the gate of a field effect transistor (FET) 124. In the preferred embodiment, the FET is a type IRF 440. The drain terminal of field effect transistor 124 is electrically connected to one side of the primary coil 14 of the transformer 12. The other side of the primary coil 14 is electrically connected to the other terminal of capacitor 104 and the supply voltage $V_C$ terminal 26. The source terminal of field effect transistor 124 is electrically connected to the second terminal of resistor 106.

Referring now to FIG. 2, there is shown a preferred embodiment of the switching regulator current limit circuit of the present invention, generally designated 200. The current limit circuit 200 comprises an operational amplifier 202 having an inverting (−) input, a non-inverting (+) input and an output. The inverting input of the operational amplifier 202 is electrically connected to one terminal of a 10 K-ohm resistor 204 and one terminal of a 10 K-ohm resistor 206. The other terminal of resistor 206 is electrically connected to the output of operational amplifier 202 and one terminal of a 6.5 K-ohm resistor 208. The other terminal of resistor 208 is electrically connected to one terminal of a 10 K-ohm resistor 210, one terminal of an 11 K-ohm resistor 212, and the non-inverting (+) input of an operational amplifier 214. The second terminal of resistor 210 is electrically connected to one terminal of a 10 K-ohm resistor 216. The other terminal of resistor 216 is electrically connected to the inverting (−) input of a third operational amplifier 218, one terminal of a 14 K-ohm resistor 220, the cathode of a diode 222 and one terminal of a 10 K-ohm resistor 224. The other terminal of resistor 224 is electrically connected to the second terminal of resistor 212 and the anode of a diode 226.

The cathode of diode 226 is electrically connected to the anode of diode 222 and the output of the third operational amplifier 218. The non-inverting (+) input of the third operational amplifier 218 is electrically connected to the $V_A$ terminal 32, one terminal of a 10 K-ohm resistor 228, one terminal of a 470 ohm resistor 230, and the emitter of an NPN transistor 232. The second terminal of resistor 228 is electrically connected to one terminal of a 10 K-ohm resistor 234 and the non inverting input of operational amplifier 202. The other terminal of resistor 234 is electrically connected to reference level (0) terminal 28, one terminal of a 12 K-ohm resistor 236 and one terminal of a 12 K-ohm resistor 238.

The other terminal of resistor 236 is electrically connected to the clock input "C" of a flip-flop 240 and the collector of a PNP transistor 242. In the preferred embodiment, the flip-flop 240 is a C/MOS type 4013. The second terminal of resistor 238 is electrically connected to the reset input "R" of flip-flop 240 and the collector of a PNP transistor 244. The data input "D" of flip-flop 240 is electrically connected to the emitter of transistor 242, one terminal of a 22 K-ohm resistor 246, the emitter of transistor 244, one terminal of a 22 K-ohm resistor 248 and the $V_B$ terminal 30. The second terminal of resistor 246 is electrically connected to the base of transistor 242 and one terminal of a 47 K-ohm resistor 250. The second terminal of resistor 250 is electrically connected to the collector of transistor 232.

The second terminal of resistor 248 is electrically connected to the base of transistor 244 and one terminal of a 47 K-ohm resistor 252. The other terminal of resistor 252 is electrically connected to the collector of an NPN transistor 254. The base of transistor 254 is electrically connected to the cathode of a diode 256, the inverting (−) input of operational amplifier 214 and the second terminal of resistor 230. The emitter of transistor 254 is electrically connected to the anode of diode 256 and the output of operational amplifier 214. The base of transistor 232 is electrically connected to one terminal of a 1 K-ohm resistor 258. The output "Q" of flip-flop 240 is electrically connectd to the cathode of a diode 260. The anode of diode 260 is electrically connected to one terminal of a 1 K-ohm resistor 262. The other terminal of resistor 262 is electrically connected to the base of transistor 114, the base of transistor 112 and the second terminal of resistor 110 (see FIG. 1). The junction of the source terminal of the FET transistor 124 and the second terminal of resistor 106 ($E_{FB}$ in FIG. 1) is electrically connected to the second terminal of resistor 204 (see FIG. 2). The cathode of zener diode 52 ($V_{REF}$ in FIG. 1) is electrically connected to the junction of resistors 210 and 216 (see FIG. 2). The junction of the cathode of diode 88 and the anode of diode 90 (SIG 1 in FIG. 1) is electrically connected to the second terminal of resistor 258 (see FIG. 2). The inverting input of operational amplifier 42 ($V_{FB}$ in FIG. 1) is electrically connected to the second terminal of resistor 220 (see FIG. 2).

The switching regulator current limit circuit 200 of the present invention operates in conjunction with the flyback switching regulator 10 as follows. The operation of the circuits will be described referring to the following signals. $V_{REF}$ is a predetermined reference voltage which is equal to 1.23 volts in the preferred embodiment. $V_{FB}$ is the output voltage of operational amplifier 42 and is equal to the voltage appearing across the feedback coil 18 of the transformer 12 less the forward drop of diode 34. The magnitude of $V_{FB}$ is a function of the magnitude of the voltage appearing across the secondary coil 16. $E_{FB}$ is the voltage appearing at the junction of resistor 106 and the source terminal of field effect transistor 124, referenced to the reference voltage level (0) at terminal 28, and is a function of the current through the primary coil 14. $E_{FB}'$ is the signal resulting from level shifting $E_{FB}$ from the (0) reference level line to the $V_A$ voltage line and inverting this level shifted signal. Both $E_{FB}$ and $E_{FB}'$ are voltage signals which are a function of the current in primary coil 14. $V_A$ and $V_B$ are input voltages for control power which are equal to 6 volts and 12 volts respectively in the preferred embodiment. As previously described, the $V_A$ voltage is applied to the fourth terminal 32; the $V_B$ voltage is applied to the third terminal 30; and both of these input voltages referenced to the zero potential level applied at the second terminal 28. Signals $V_{FB}$; $V_{REF}$ and $E_{FB}'$ are all referenced to $V_A$. $E_{FB}$ is referenced to the reference voltage level (0).

The output of operational amplifier 72, SIG 1, is a square wave voltage which is applied to the base-emitter of transistor 232 through resistor 258 (see FIG. 2). The output of operational amplifier 64, SIG 2, is a triangular voltage wave which is applied to the inverting (−) input of operational amplifier 58 through resistor 60, and the non-inverting (+) input of operational amplifier 72 through resistor 66. The square wave SIG 1 is preferably in synchronism with the triangular wave SIG 2. $I_1$ is the current flowing from the second terminal of resistor 262 (see FIG. 2) and is combined with the current from the second terminal of resistor 110 and applied to the base of transistor 114, and the base of transistor 112 (see FIG. 1).

When the "Q" output of flip-flop 240 is a "1", the voltage at "Q" is approximately equal to $V_B$ (note that a "1" in the preferred embodiment is a signal level between the threshold of the logic and voltage $V_B$, and above voltage $V_A$ near voltage $V_B$) and diode 260 is reversed biased, blocking the signal to transistor 112 and transistor 114. Under these conditions, transistors 112 and 114 will operate under the control of the output signal of operational amplifier 58. That is, when the sum of SIG 2 and the output of operational amplifier 50, as divided by resistors 56 and 60, is negative with respect to $V_A$, a current will flow from the output of operational amplifier biasing transistor 112 on and transistor 114 off. This causes transistors 118 and 102 to be biased on and off respectively, causing FET 124 to be turned on. When the sum of SIG 2 and the output of operational amplifier 50, as divided by resistors 56 and 60, is positive with respect to $V_A$, a current will flow from $V_A$ to the output of operational amplifier 58 biasing transistor 112 off and transistor 114 on. This causes transistor 118 and 102 to be biased off and on respectively, causing FET 124 to be turned off. The switching of FET 124 causes the output voltage appearing across the load 24 to remain within the designed limits by adjusting the duty cycle as a function of the magnitude of the input voltage in accordance with known flyback switching regulator theory. That is, $V_0 = (N_2/N_1) \cdot V_{IN} (T_{ON}/T_{OFF})$, where $N_2/N_1$ is the secondary to primary turns ratio, and $T_{ON}/T_{OFF}$ is the ratio of the time which the input voltage $V_{IN}$ is applied to the primary coil to the time which $V_{IN}$ is removed during each cycle. Consequently, if the unregulated input voltage $V_{IN}$ decreases, the ratio of the time the input voltage is applied to the primary coil to the time it is removed during each cycle is increased in order to maintain a constant output voltage $V_0$. See, for example, the General Electric "electronic data library Transistors-Diodes" published in 1982 by the Semiconductor Products Department, General Electric Company, Auburn, N.Y. 13021, Chapter 4, pages 71 through 114, which is incorporated in this detailed description as if fully set forth herein.

When the "Q" output of flip-flop 240 is a "0", the voltage at "Q" is approximately equal to the reference voltage level (0) (note that a "0" in the preferred embodiment is a signal level between the threshold of the logic and voltage (0) and below voltage $V_A$ near voltage (0)) and diode 20 conducts, overcoming the signal output from operational amplifier 58, turning on transistor 114, and biasing transistor 112 off regardless of the signal output from operational amplifier 58. As previously stated when transistor 114 is on and transistor 112 is off, FET 124 is biased OFF. Therefore when the "Q" output of flip-flop 240 is "0", FET 124 is turned OFF regardless of the output from operational amplifier 58.

In further describing the operation of this circuit, it will be first assumed that the system is working normally as a voltage regulator at its normal output voltage, and with no current overload condition present. The values of $V_{REF}$, $E_{FB}'$, resistor 208 and resistor 210

(see FIG. 2) are selected such that the junction of resistors 208 and 210 is positive with respect to $V_A$ under normal output voltage and current conditions. In addition, signals $V_{REF}$ and $V_{FB}$, and resistors 216 and 220 are selected so that the junction of resistor 216 and 220 requires a current from the output of operational amplifier 218. Since the junction of resistors 208 and 210 is electrically connected to the non-inverting (+) input of operational amplifier 214, and is positive with respect to $V_A$ which is electrically connected to the inverting (−) input of operational amplifier 214, a current will flow from the output of operational amplifier 214 through diode 256 causing transistor 254 to be biased off. As a result, under the normal operating conditions assumed, transistor 254 is biased off, which in turn prevents a turn-on signal to transistor 244 which prevents the application of a reset signal to the reset signal input "R" of the flip-flop 240.

As previously stated, square wave SIG 1 is applied to the base of transistor 232 through resistor 258. This causes transistor 232 to turn on during each positive excursion of the square wave SIG 1. Turning on transistor 232 will turn on transistor 242 which in turn will cause a clock signal to appear at the clock input "C" of flip-flop 240. The clock input causes the "1" signal at D to be transferred to output "Q" a short time after the clock input becomes a "1" signal. Consequently, the output "Q" of flip-flop 240 will remain a "1" signal as long as there is no reset signal at "R". When "Q" is a "1", diode 206 prevents any significant current from flowing through resistor 262, which in turn allows the output of operational amplifier 58 to control transistor 112 and transistor 114 as previously stated. As a result, the voltage regulator is under the normal switching control of field effect transistor 124 as switched by the output of operational amplifier 58 through transistors 112, 114, 118 and 102. That is, the field effect transistor 124 will switch on when the sum of SIG 2 and the output of operational amplifier 50 as divided by resistors 56 and 60 is negative compared to $V_A$ and off when the sum of SIG 2 and the output of operational amplifier 50 are divided by resistors 56 and 60 is positive compared to $V_A$.

Signals $V_{REF}$ and $E_{FB}'$, and resistors 208 and 210 are also selected so that under output current overload conditions, the junction of resistors 208 and 210 becomes negative with respect to $V_A$ thereby causing operational amplifier 214 to generate a negative voltage output compared to $V_A$. This causes current to flow through resistor 230 and through the base emitter junction of transistor 254 causing that transistor to turn on. This is in turn causes transistor 244 to turn on which applies a reset signal to the reset terminal "R" of flip-flip 240. This reset signal then causes a (0) to appear at the output "Q" of flip-flop 240.

R 262 is selected so that when output "Q" of flip-flop 240 is a "0", signal $I_1$ is large enough to overcome the signal from operational amplifier 58 through resistor 110. A zero at the output "Q" of flip-flop 240 causes transistor 114 (see FIG. 1) to turn on. This in turn causes transistor 102 to turn on which turns the field effect transistor 124 off. Turning off field effect transistor 124 stops the flow of current in the primary coil 14 of the transformer 12, which in turn causes a limiting of the current flowing in the secondary coil 16. This causes the output voltage appearing at the secondary coil 16 to drop which in turn causes the voltage $V_{FB}$ appearing at feedback coil 18 to lower; that is, become less negative.

Without the switching regulator current limit circuit 200, lowering of $V_{FB}$ would cause the output of operational amplifier 42 to become less negative which causes the output of operational amplifier 50 to become more negative. This causes the sum of SIG 2 and the output of operational amplifier 50, as divided by resistors 56 and 60 to become more negative, causing FET 124 to remain on for longer periods of time. However, $V_{FB}$, $V_{REF}$, resistor 216 and resistor 220 are selected in the preferred embodiment of circuit 200 so that the current of resistor 220 becomes less than the current of resistor 216 when the output voltage across capacitor 22 drops below its rated value.

With the current of resistor 220 being lower than the current of resistor 216, the output of operational amplifier 218 becomes negative causing the junction of resistor 224 and 212 to become negative. This in turn lowers the effective value of $V_{REF}$; that is, subtracts current from the junction of resistors 208, 210 and 212 which was supplied by $V_{REF}$ through resistor 210. This decrease in the effective value of $V_{REF}$ permits the current limit level of $E_{FB}'$ to be decreased. This causes operational amp 214 to turn on transistors 254 and 244, applying a reset signal at the R input of flip-flop 240 as previously described. This causes FET 124 to turn off regardless of the output of operational amplifier 58. Consequently, this decrease in the current limit level of $E_{FB}'$ causes a lowering of the primary circuit current limit and will minimize the increase in output current when the secondary circuit is subjected to a substantial overload or short circuit.

While the principles of the invention have now been made clear in an illustrative embodiment, there will be obvious to those skilled in the art, many modifications of elements, components and arrangement thereof used in the practice of the invention and otherwise, which are particularly adapted for specific environments and operating requirements without departing from those principles. The appended claims are, therefore, intended to cover and embrace any such modifications within the limits only of the true spirit and scope of the invention.

I claim:

1. In a voltage regulator comprising a transformer having a primary coil for receiving an input voltage and a secondary coil for providing an output voltage of predetermined magnitude, means for limiting the magnitude of a short circuit current in said secondary coil comprising:
   a. means for sensing current magnitude in said primary coil;
   b. means for setting a current limit level based upon a predetermined maximum current magnitude in said primary coil;
   c. means for sensing secondary coil voltage magnitude;
   d. means for reducing said current limit level based upon a sensed reduction of said secondary coil voltage; and
   e. means for removing the input voltage from said primary coil when the magnitude of said sensed primary coil current exceeds said current limit level as reduced by said sensed reduction of said secondary coil voltage magnitude.

2. An apparatus in accordance with claim 1 wherein said means for sensing current magnitude in said primary coil comprises means for producing a voltage $E_{FB}$ which is proportional to the magnitude of current in said primary coil.

3. The apparatus in accordance with claim wherein said means for producing said $E_{FB}$ voltage comprises a resistor of predetermined value connected in series with said primary coil.

4. An apparatus in accordance with claim 2 wherein said means for setting said current limit level comprises means for producing a voltage $E_{FB}'$ which is proportional to the magnitude of $E_{FB}$, comparing the magnitude of $E_{FB}'$ with an effective value of a predetermined reference voltage $V_{REF}$ and providing a current limit signal whenever the magnitude of $E_{FB}'$ exceeds the effective value of $V_{REF}$ by a predetermined amount.

5. The apparatus in accordance with claim 4 wherein said means for sensing secondary coil voltage magnitude comprises a feedback coil wound on said transformer such that the voltage across said feedback coil is proportional to the magnitude of said secondary coil voltage, and means for producing a voltage $V_{FB}$ which is proportional to the voltage across said feedback coil.

6. The apparatus in accordance with claim 5 wherein said means for reducing said current limit level comprises means for reducing the effective value of $V_{REF}$ by an amount which is proportional to an amount of reduction of the magnitude of $V_{FB}$.

7. An apparatus in accordance with claim 6 wherein said means for removing the input voltage from said primary coil comprises switch means connected in series with said primary coil, said switch means being operable by said current limit signal to open said primary coil circuit thereby removing the input voltage therefrom.

8. A method for limiting the magnitude of a short circuit current in the output of a voltage regulator comprising a transformer having a primary coil for receiving an unregulated input voltage and a secondary coil for providing an output voltage of predetermined magnitude, said method comprising the steps of:
   a. measuring the magnitude of current in said primary coil;
   b. setting a current limit level based upon a predetermined maximum current magnitude allowable in said primary coil;
   c. measuring secondary coil voltage magnitude;
   d. reducing said current limit level based upon a measured reduction of said secondary coil voltage; and
   e. removing the input voltage from said primary coil when the magnitude of said measured primary coil current exceeds said current limit level as reduced by said measured reduction of said secondary coil voltage magnitude.

9. The method in accordance with claim 8 wherein the step of measuring current magnitude in said primary coil comprises producing a voltage $E_{FB}$ which is proportional to the magnitude of current in said primary coil.

10. The method in accordance with claim 9 wherein the step of setting said current limit level comprises the steps of:
   a. producing a voltage $E_{FB}'$ which is proportional to the magnitude of $E_{FB}$;
   b. comparing the magnitude of $E_{FB}'$ with an effective value of a predetermined reference voltage $V_{REF}$; and
   c. providing a current limit signal whenever the magnitude of $E_{FB}'$ exceeds the effective value of $V_{REF}$ by a predetermined amount.

11. The method in accordance with claim 10 wherein the step of sensing secondary coil voltage magnitude comprises the steps of:
   a. providing a feedback coil on said transformer such that the voltage across said feedback coil is proportional to the magnitude of said secondary coil voltage; and
   b. producing a voltage $V_{FB}$ which is proportional to the voltage across said feedback coil.

12. The method in accordance with claim 11 wherein said step of reducing said current limit level comprises reducing the effective value of $V_{REF}$ by an amount which is proportional to an amount of reduction of the magnitude of $V_{FB}$.

13. The method in accordance with claim 12 wherein said step of removing the input voltage from said primary coil comprises the steps of:
   a. connecting switch means in series with said primary coil; and
   b. opening said switch means upon application of said current limit signal.

* * * * *